United States Patent [19]

McFeaters et al.

[11] Patent Number: 4,865,862
[45] Date of Patent: Sep. 12, 1989

[54] METHOD OF PREPARING THIN UNIFORMLY BAKEABLE EDIBLE ASSORTMENTS

[75] Inventors: Richard R. McFeaters, Hackensack; Daniel A. Koppa, Bloomfield, both of N.J.; Theodore P. Babiak, Staten Island, N.Y.

[73] Assignee: Nabisco Brands, Inc., Parsiappany, N.J.

[21] Appl. No.: 58,918

[22] Filed: Jun. 5, 1987

[51] Int. Cl.⁴ .............................................. A21D 10/00
[52] U.S. Cl. ..................................... 426/496; 426/502; 426/503; 426/518; 426/549
[58] Field of Search ............... 426/549, 518, 502, 503, 426/496

[56] References Cited

U.S. PATENT DOCUMENTS

| | | | |
|---|---|---|---|
| 139,217 | 5/1873 | Webster | 425/298 |
| 859,999 | 7/1907 | Werner | 425/363 |
| 1,446,513 | 2/1923 | Morris | 112/121.11 |
| 2,681,625 | 6/1954 | Babbit | 30/130 |
| 2,813,033 | 11/1957 | Schneider | 426/392 |
| 3,070,476 | 12/1972 | Miller | 428/159 |
| 4,562,084 | 12/1985 | McKee | 426/502 |

OTHER PUBLICATIONS

O.O.M.S.—Advertisement Brochure.
G.P.A. Orlandi—Advertisement Brochure.
Errebi s.r.l., via Ca Mignola Vecchia, 705—P.O. Box 88, 45021 Badia Polesine, Rovigo, Italy.

*Primary Examiner*—Donald E. Czaja
*Assistant Examiner*—Mary S. Mims
*Attorney, Agent, or Firm*—Richard Kornutik

[57] ABSTRACT

Assortments of thin uniformly bakeable, and baked, goods such as biscuits, crackers or cookies are efficiently provided. For example, a uniformly baked sample of chemically leavened laminated buttery-flavored thin crackers can be prepared having about 33 percent by number nickel size items, about 33 percent by number dime size items and the remainder quarter size items on a continuous basis on one production line employing a regularly interposited array formed with an appropriately analogous cutting die.

22 Claims, 8 Drawing Sheets

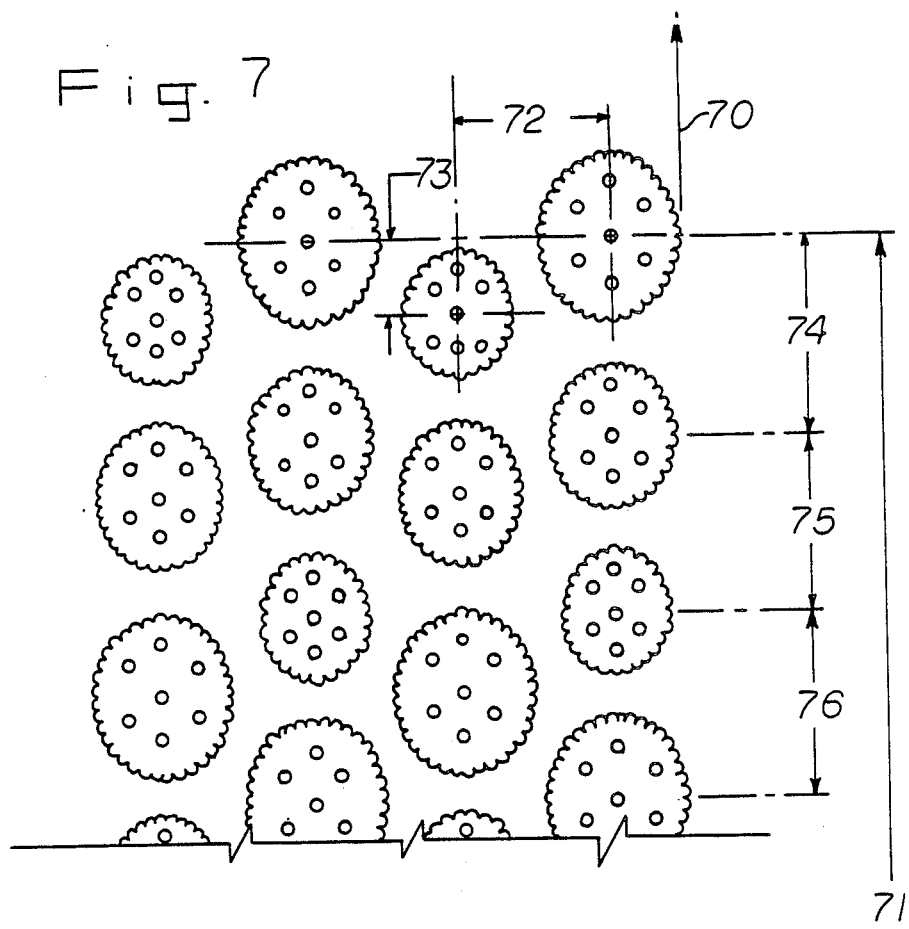
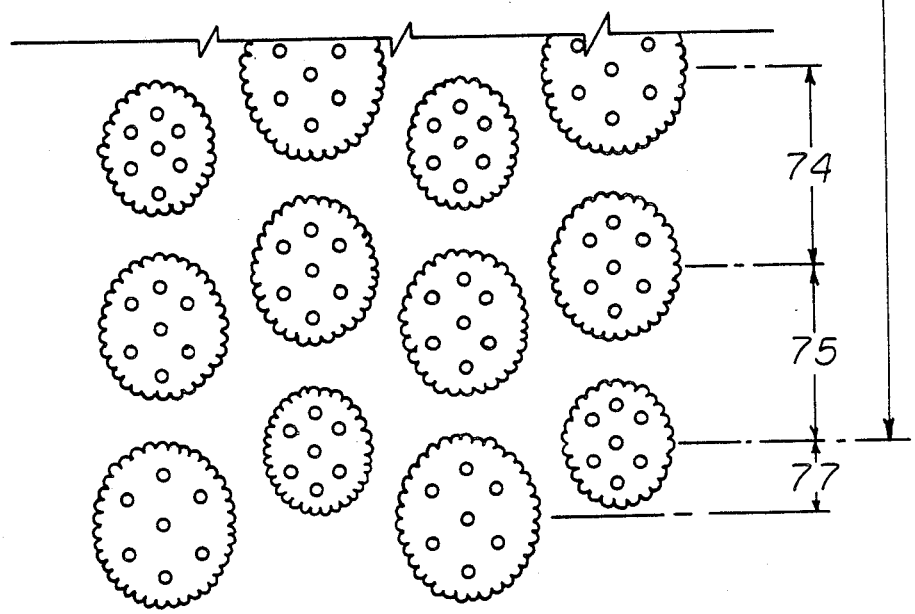
Fig. 7

METHOD OF PREPARING THIN UNIFORMLY BAKEABLE EDIBLE ASSORTMENTS

FIELD

The instant invention concerns assortments of such goods as biscuits, crackers or cookies, with a procedure, that is, a method and/or process, for their preparation, including apparatus with a cutting die for employment therewith. Said assortments are generally useful as edible goods.

BACKGROUND

Certain procedures for preparing biscuits, crackers and cookies are known. For example, McKee, U.S. Pat. No. 4,562,084 (Dec. 31, 1985), discloses a method of feeding cookie preforms to a bakery oven which utilizes conveyer belts. Therein, cookie preforms are fed to a bakery oven by extruding a plurality of parallel ribbons of cookie dough extrudate onto a first conveyor belt, cutting the ribbons in a staggered pattern to form individual cookie preforms and feeding the preforms onto a second conveyor belt moving at a speed at least twice that of the first conveyor belt in order to separate successive preforms by at least the length of a cookie preform.

Werner, U.S. Pat. No. 859,999 (July 16, 1907), discloses a machine for making cookies. Schneider, U.S. Pat. No. 2,813,033 (Nov. 12, 1957) discloses a method for packaging or preparing a group of formed pieces of edible doughy material ready for cooking.

It is desirable to efficiently and at once provide an assortment of such edible goods as biscuits, crackers or cookies which have significant weight variation between or among items in the assortment. Yet, such provision of same has been generally lacking in the art, and problems in uniformly baking such assortments have remained unsolved.

SUMMARY

The invention, in one aspect, includes a procedure for providing a regularly interposited, thin, uniformly bakeable assortment comprising forming an array of said assortment under conditions such that said assortment array is provided. Another aspect is said bakeable assortment array. A further aspect includes baking said bakeable assortment array under conditions such that the baking is uniformly carried out. An additional aspect is an apparatus having an interposit cutting die which can generally provide for said bakeable assortment. Another aspect is said interposit cutting die.

The invention can provide edible goods. It can furthermore so provide highly unexpected efficiency, for example, in material and/or energy utilizations in processing, to include the baking of said bakeable assortment. Moreover, adjustment time required to alter final bake characteristics can be significantly low, for example, about ten or fifteen minutes, and, thereby, the baking procedure can substantially decrease baking downtime and increase further the efficiency. Significantly, only one production line is needed for any desired baking of said assortment array and the bakeable assortment has a plurality of differing sized items which have substantially different weights between or among the items. Said assortment array is a focal point of the invention.

ILLUSTRATIVE DETAIL

In general, the procedure for providing a regularly interposited thin, uniformly bakeable assortment comprises forming an array of the regularly interposited, thin, uniformly bakeable assortment under conditions such that said assortment array in provided. Provision of this assortment array is the most significant feature of the invention.

By "regularly interposited" is meant a planar pattern wherein a plurality of thin, bakeable items of at least two differing sizes, by way of illustration, say, from two to about five sizes, are placed with at least one of the differing sizes of items in intervening position(s) to the other(s) along at least one axis in the planar pattern which is formed, built, arranged or ordered according to a recurrable or recurring orderly system. Preferably, the regularly interposited pattern has three differing sizes of thin, bakeable items with at least two of the three sized items in the intervening position(s) to the third sized item along at least one axis in the planar pattern. The array which is formed more particularly defines the regular interposit of the thin, uniformly bakeable assortment.

By "thin" is meant measuring little in vertical cross section in general comparison to the horizontal distance of the bakeable items. Suitably, by way of illustration, such vertical cross section can be from about one fifth to about one twentieth the general horizontal distance of the bakeable item. The horizontal distance is the average distance in those general directions upon which the bakeable item is supported, for example, by a conveyor, prior to or during any baking.

The bakeable item suitably can have a generally simple shape, particularly in its horizontal directions. By way of illustration, such simple shapes as, in general, circular, square, oblong circular, for instance, elliptical with its major axis about twice the distance of its minor axis, rectangular, for instance, with its length about twice its width, regular pentagonal, hexagonal, heptagonal or octagonal, clamshell-like, oyster shell-like or scallop shell-like, apple tree leaf-like, birch tree leaf-like, or spearmint leaf-like, scallop-edged circular, scallop-edged square and so forth and the like. Docker holes, snappable perforations, decorative impressions and so forth and the like can be present therein.

By "uniformly bakeable" is meant a group of the items of generally similar composition which are capable of being baked thus together, and upon such baking, presenting, in general, a substantially unvaried composition and substantially unvaried appearance of surface and color throughout the group or assortment. Such appearance can include a golden brown color, for instance, which can result from addition of such an ingredient as, for example, monobasic calcium phosphate monohydrate. Of course, for instance, items within the assortment may have their specific composition altered in order to deviate from the generally substantially unvaried appearance such as by, for example, selective sugar coating before baking, without which the items would be uniformly bakeable, and these, too, would thus be considered capable of being baked together in order to present in general a substantially unvaried composition and appearance of surface and color, and thus be uniformly bakeable.

By "assortment" is meant that at least two differing groups of sizes of the items are present, with substantial weight variation between or among the sizes of the items. The assortment thus contains a plurality of the regularly interposited, thin, uniformly bakeable items. Preferably, three sizes are present. Suitable ratios of the number of each size item in relation to the total number of items in the assortment can generally range from about half of the reciprocal of the number or less of the sizes of the items in the assortment to about three halves or more of the number reciprocal of the of the sizes of the items of one other size and so forth. As an illustration, with two sizes of items in the assortment, suitable ratios of each size item can generally range from about 25 to about 75 percent by number of the total number of items in the assortment. Commonly, the ratios of each size items are about the reciprocal of number of sizes. As an illustration of the latter, with three sizes of items in the assortment, a common ratio of the number of items of each size is about 33 percent or so by number. Further, the assortment itself is composed of the thin items, that is, it is generally such a group as one having items of a uniform thinness, or of general little vertical cross section in general comparison to the horizontal distance of substantially each bakeable item throughout the assortment. The thin dimensions are provided as is known in the art. As an illustration, thin dimensions may be provided by melting of appropriate more spherical-like dough masses, for instance, assortments of sugar cookie dough. Preferably however, the thin dimension is provided generally by an initially thin dough, typically, for example, by cutting out a uniformly thin dough sheet into the assortment items of the array. Furthermore, the bakeable items are generally of sizes which result in item weights which have substantial ratio correlation, which means that the presence of one such size thin bakeable item can generally establish the incidence of the other sized item(s). As an illustration, a base, thin, bakeable item with a generally circular horizontal diameter of about seven-eighths of an inch (about 2.22 cm) and weight of about 6.3 grams (g) can generally establish the incidence of approximately equivalent amounts of two accompanying sets of analogous bakeable items, one with a horizontal diameter of about an inch (about 2.54 cm) and weight of about 8.25 g and the other with a horizontal diameter of about three-fourths an inch (about 1.905 cm) and weight of about 4.9 g. More generally, the base item can suitably establish the incidence of the accompanying sized assortment item(s) which, with illustration of the substantial weight variation included, can deviate in weight on average by an amount in increment(s), say, from about 10 to about 40 or even about 50 percent therefrom and preferably from about 18 to about 35 percent therefrom. Illustratively, for example, with five sizes of analogously shaped thin, bakeable items in the assortment and with the middle-weighted item of, say, 5 g, selected as the base item, the other sized items can be about 3 g, about 4 g, about 6 g and about 7 g, which are each about 20 percent increments from the 5 g. Items within each size category typically have substantially equivalent weights. Such small change assortments as those analogous to the diameters of a United States nickel, dime and quarter; the diameters of a United States penny, quarter and half-dollar; the diameters of a United States quarter, half-dollar and large silver dollar; and so forth and the like are generally possible with the invention. The three-piece nickel, dime, and quarter assortment is preferred.

By "array" is meant a regular and imposing grouping or arrangement of the items which are interspaced thereby and which include in general the thin, bakeable, any baking, and appropriately ordered uniformly baked items. In general, the array can be considered an orderly grouping or arrangement in reference to axes extending horizontally therethrough including by rows, columns and oblique axes, as appropriate. The assortment to be uniformly bakeable must be in an array which sufficiently would allow the uniform baking, and the assortment is regularly interposited within the array. Thus, spacings between the thin, bakeable items within the regularly interposited assortment array are those which are sufficient to permit the uniform baking of the thin, bakeable items therewithin. Accordingly, the spacings can generally include dimensions, say, from about 5 through about 25 percent to about 50 through about 200 percent of the general horizontal distance of the base items, with lesser spacings as such typically being measured between outer boundries of the thin, bakeable items along axes which are in general rows and columns and with greater spacings as such typically being measured between outer boundries of the thin, bakeable items along axes which are in general substantially oblique, say, from about 30 to about 60 degrees, to any general rows and columns and which result in reasonably moderate values of the greater spacings as such. Preferably, the spacings along axes which are in general rows and columns are so from about 9 to about 18 percent with the spacings along axes which are in general the substantially oblique diminishing accordingly.

In general, the interposit cutting die is a die manufactured to specifications which can cut and essentially provide for the regularly interposited, thin, uniformly bakeable assortment array. The manufacturing of the interposit cutting die can be by methods known in the art. For example, the method employed for manufacturing the interposit cutting die can include electro-displacement machining and so forth and the like.

The apparatus of the invention has the interposit cutting die, which can generally provide for the bakeable assortment of the invention, as a fixture thereto. Thus, the apparatus can appropriately include such a cutting mechanism as a reciprocating or rotary cutting mechanism with the appropirate interposit cutting die of the invention affixed thereto and which is capable of cutting out the generally thin dough and providing for the assortment array of the invention.

The regularly interposited, thin, uniformly bakeable assortment array is formed under conditions sufficient to form said assortment array. The conditions can include mixing of a dough, which is typically employed for the purpose of providing the edible goods, rolling the dough, laminating the dough, gauging the dough, feeding the dough to the cutting apparatus having the interposit cutting die, and cutting the dough, which is so fed, into the regularly interposited, thin, uniformly bakeable assortment array.

The mixing generally provides the dough in rudimentary form. The mixing of the dough to include cracker dough can be by methods known in the art. Ingredients of the dough are thus mixed together by suitable means, for example, in upright or in spindle type industrial scale mixers, for several to about two score (40) minutes or even several hours at a maximum temperature typically of, say, about 120° F. (49° C.) in general. The mixing can be carried out from about five or ten to about fifteen or twenty minutes in the mixer at a maximum temperature of, say, about 115° F. (46° C.), especially when employing the chemical leavening agents and the enzymes, as is known in the art.

The ingredients of the dough can generally include those known in the art which are desired to be employed. Suitable ingredients can include those appropriately selected from such farinaceous goods as meals, flours, hulls, seeds, nuts and so forth and the like, including those, for example, of wheat, barley, rye, rice, potato, soy, oats, Jerusalem artichoke, cattail, acorn, almond, walnut, and so forth, sugars and syrups, edible salts, edible waxes, oils and fats, yeasts, such chemical leavening agents as, for example, sodium bicarbonate and ammonium bicarbonate, enzymes, preservatives, such artificial and natural flavorings as, for example, sour cream and onion, sesame seeds, poppy seeds, benzaldehyde, oil of vanilla, cheeses, fruit meats and animal meats, sauces therewith, such liquid diluents as, for example, water, milk and or ethyl alcohol, vitamin and mineral supplements, medicines, and so forth and the like.

Significantly, for instance, most if not all typical cracker doughs can be suitably employed. Thus, such "straight" cracker doughs as those which are basically prepared with, for example, about 100 pounds (45 kg) flour, about 10 or so pounds (4.5 kg) shortening as desired, about 10 or so pounds (4.5 kg) sugar as desired, an optional leavening system appropriate to the desired textural characteristics of the final cracker, which can be prepared by baking, and water as required to form the dough, and so forth and the like can be suitably employed. In addition to the straight cracker doughs, such "sponge and dough" cracker doughs as those which are basically prepared with, for example, a sponge portion containing about 60 pounds (27 kg) sponge flour, about ⅛ or so pounds (57 g) yeast and about 30 or so pounds (13.6 kg) water, which portion is mixed and allowed to ferment for a suitable period, say, about 18 or so hours whereupon the temperature of the sponge portion which is fermented can be about 82° F. (27.8° C.), and as is known in the art, to which sponge portion which is fermented is added the dough portion containing about 40 pounds (18 kg) dough flour, about 10 or so pounds (4.5 kg) shortening as desired, about 1½ or so pounds (680 g) malt syrup as desired, about 1½ or so pounds (680 g) salt as desired and generally enough baking soda to desirably neutralize any sourness or acidity present, say, from about ½ or so pounds to about ⅝ or so pounds (230 to 280 g) baking soda, as is known in the art, can thus be employed in the invention.

The dough may be next proofed, as appropriate. For instance, such a cracker dough as a laminatable, buttery, chemically leavened self-rising cracker dough is suitably proofed for about a time from one to several hours, and such a cracker dough as the sponge and dough cracker dough is suitably proofed for about a time from three to five hours.

From there, the rolling and or the laminating, the gauging, that is, making the dough uniformly thin in vertical cross section, the feeding and the cutting can be carried out. The items of the assortment array batch can also be salted or seasoned, suitably with, say, from about 1 to about 3 pounds (0.5 to 1.4 kg) of such a seasoning as one containing mainly sodium chloride, per 100 pounds (45 kg) of flour which is in general initially employed. Suitable baking can then follow.

The baking of the dough can be by general methods known in the art, however, with employment of the regularly interposited, then, uniformly bakeable assortment array. As an illustration, baking of the cracker dough in said bakeable assortment array is suitably carried out in a conveyor-type, multi-stage oven. Suitably, such baking is carried out under those conditions, as is known in the art, which result in a cracker product having a moisture content from about 1 to about 6 percent by weight moisture and desirably maximally about 4 percent by weight moisture. The color of the final product is that which is desired, for example, a light to a golden brown cracker. Such other characteristics as pH and so forth are those which are desired by the artisan.

Post baking processing can include spray mist oiling, salting, spicing or flavoring, sandwiching and so forth. As an illustration, with the laminatible, buttery, self-rising chemically leavened cracker dough, which is baked, post baking processing suitably employs spray mist oiling with, say, from about 30 to about 40 pounds (13.6 to 18.2 kg) of such a desired edible oil per the foregoing batch as of soybean, palm and/or coconut.

DRAWINGS

I. In Brief

FIG. 2 is generally scaled to be substantially proportionate throughout the die pattern.

FIG. 3 is generally scaled to be substantially proportionate throughout the band pattern.

FIG. 4 is generally scaled to be substantially proportionate throughout the die pattern.

FIG. 5 is generally scaled to be substantially proportionate throughout the die pattern.

FIG. 6 is generally scaled to be substantially proportionate throughout the band pattern.

FIG. 7 (FIG. 7) is a top partial plan view of scalloped production interposit cutting die, Pattern B. FIG. 7 is generally scaled to be substantially proportionate throughout the die pattern.

FIG. 8 is generally scaled to be substantially proportionate throughout the die.

FIG. 9 is generally scaled to be substantially proportionate throughout the die.

FIG. 10 is generally scaled to be substantially proportionate throughout the die.

FIG. 11 is generally scaled to be substantially proportionate throughout the pin.

II. In Detail

Figure 1:
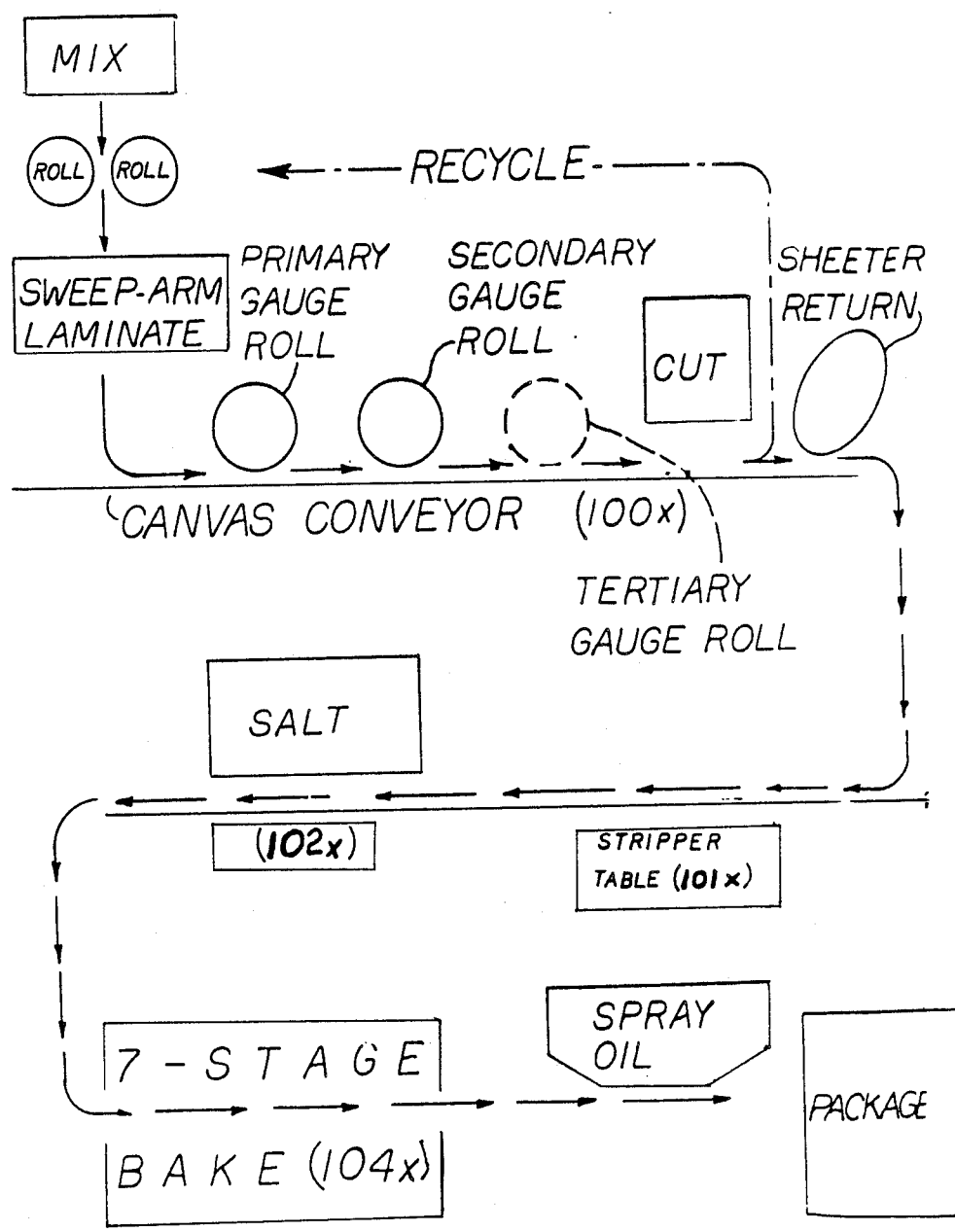
FIG. 1 (FIG. 1) is a schematic representation of a typical procedure which can be employed in order to prepare regularly interposited, thin, uniformly bakeable baked edible assortments. For example, the laminated buttery, self-risen chemically leavened cracker assortment employing the laminated, buttery, self-rising chemically leavened cracker dough can be prepared according to this procedure.

In FIG. 1, the ingredients of the dough are combined at the mix stage. Mixing can be carried out in the upright industrial mixer. The mixer can be positioned conveniently so that emptying of its contents is readily accomplished with the emptying generally into the first roll stage prior to sweep arm lamination. The positioning can be, for example, above the first roll stage. The dough can be proofed at this point. The first rolling serves to condition and flatten the dough, typically with two closely proximately positioned giant rollers, for the sweep arm laminate stage. The sweep arm laminating step laminates layers of the dough, as is known in the art, into a laminated sheet, which is conveyed on a canvas conveyor at a speed of, say, 100x, with the "x" capable of being units of speed (velocity) of, say, feet per second, to and through the gauge roll and cut stages. The primary gauge roll first makes the laminated dough sheet thin. The secondary gauge roll next further thins the laminated first gauged dough sheet to the desired thinness which results in the desired final thinness upon desirable subsequent processing to include baking. The tertiary gauge roll is optional. The gauged sheet is next conveyed under desired dough sheet tension along the conveying axis to the cut stage. The cutting step can be carried out by any suitable method, for example by a reciprocating cutting operation suitably from about 80 to 140 cut cycles per minute or, for example, by a rotary cutting operation, suitably with an about 38 inch (96.5 cm) width by about 8 inch (20.32 cm) diameter rotary cutting die, which can be more efficient than the reciprocating cutting operation. The cutting die is designed to provide the desired assortment array (band) pattern to include considerations based upon the desired assortment array itself, the dough sheet tension during the cutting, post cutting conveying characteristics and so forth. The sheeter return stage, as is known in the art, picks up scrap surrounding the items of the array from the canvas conveyor. The scrap can be appropriately recycled as a desirable option. The initially cut assortment array can be next further arranged to the desired band pattern, as is known in the art, by post cutting conveying operations including that of the stripper table which can be operated at a speed of, say, 101x. From there, the array can be conveyed to the salt stage where salt is applied as desired to the thin uniformly bakeable array. The salting can occur at a conveyor speed of, say, 102x. Next can come the bake stage, which can be by the 7-stage bake at a speed of, say, 104x. The 7-stage bake can be carried out in a 7-stage oven, typically the first stage being a preheat stage before the six main baking stages (zones). The oven, as is known in the art, can be about 300 feet (91 m) in length and about 4 feet (1.2 m) in width. The six or 7 general top and the 6 or 7 general corresponding bottom zones are generally fed with a fuel, for example, natural gas, as desired in each top and bottom zone. The baking can be carried out as desired, often suitably from about 2 to about 4 minutes. The 7-stage bake, from left to right, that is, representing start to finish, can be suitably carried out, as is known in the art, at those temperatures in each zone and portion thereof which yield the suitable bake of the thin dough items in the band, typically with the temperatures, for example from about 300° F. to about 600° F. (149° C. to about 600° C.), as desired. The first several zone temperatures typically extend throughout the 300° F.–600° F. range with the latter zones being at temperatures, say, from about 300° F. to about 500° F. (149° C. to 260° C.). Following the 7-stage bake can be a short, say, about 6 feet (1.8 m) conveyor path to the spray oil stage where the crackers which are typically at about 240° F. (116° C.) can be oiled with a spray mist of the desired edible oil, say, the desired soy bean, palm or coconut oil, which can be flavored, at about 130° F. (54° C.). From there, the thin, uniformly baked, laminated, buttery, self-risen, chemically leavened assortment, preferably a small change assortment which can be the nickel, dime, quarter sized assortment both before, in the uniformly bakeable edible assortment array, and after the baking, having, in general, about a 1:1:1 ratio thereamong, is suitably conveyed to the package stage where suitable packaging takes place.

Figure 2:
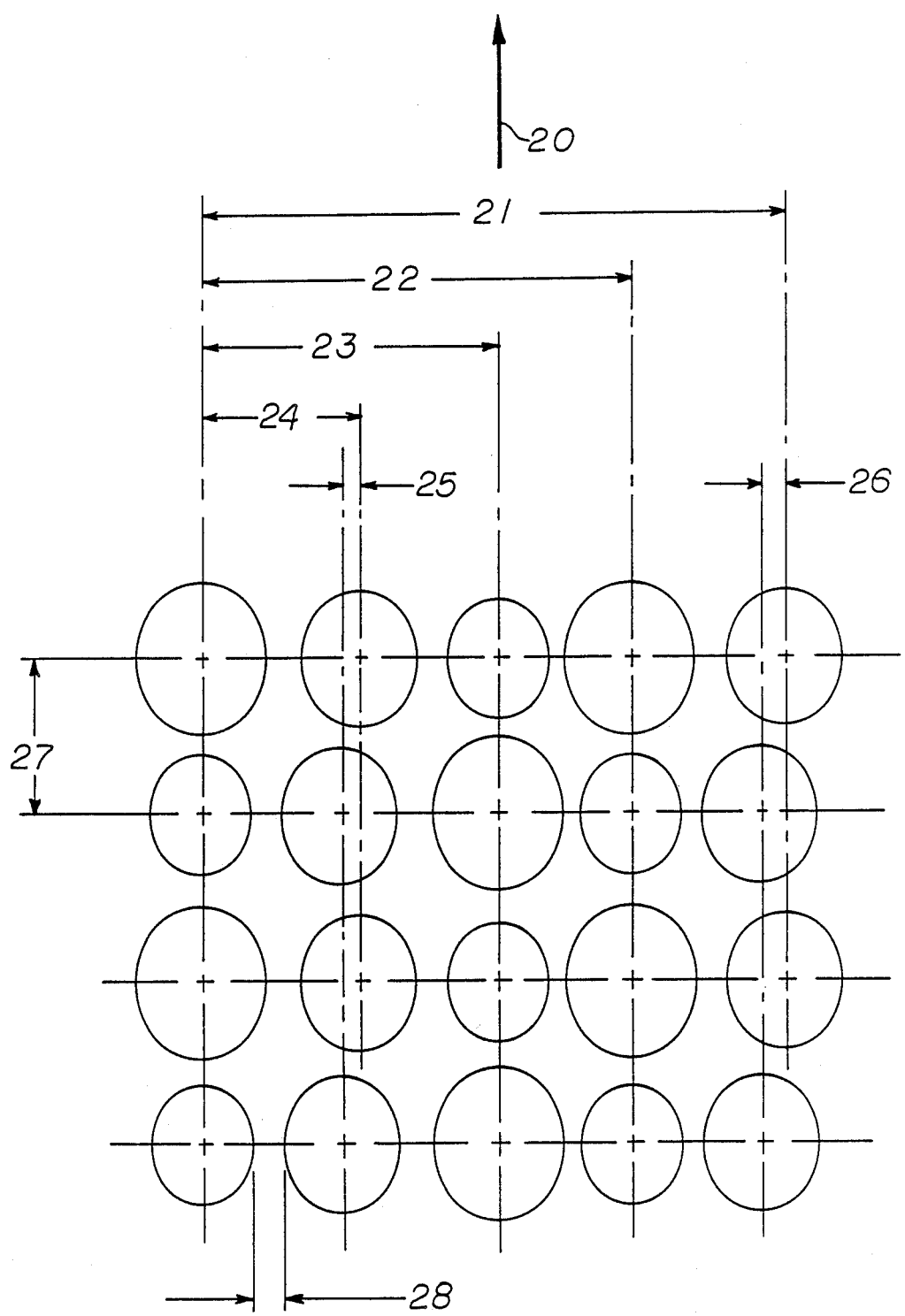
FIG. 2 (FIG. 2) is a top general plan view of interposit cutting die, Pattern A.

In FIG. 2, anticipated axis of direction of flow of the dough sheet 20 stretched along this axis is illustrated. The general cutting die Pattern A can have dimensions of 21 about 4 5/16 inches (10.95 cm), 22 about 3 3/16 inches (8.1 cm), 23 about 2⅛ inches (5.4 cm), 24 about 1⅛ inches (2.86 cm), each of 25 and 26 about ⅛ inch (0.3175 cm) or to about zero inches (0 cm), 27 about 1 3/16 inches (3.02 cm) and 28 about 3/16 inch (0.476 cm). The cuts are each circularly oblong along the axis 20. The top row of cutting dies in the array, from left to right, can have dimensions parallel to the axis 20 about 1⅛ inch (2.86 cm) for the quarter size item, about 1 inch (2.54 cm) for the nickel size item and about ⅞ inch (2.22 cm) for the dime size item, and dimensions perpendicular to the axis 20 about 1 inch (2.54 cm), about ⅞ inch (2.22 cm) and about ¾ inch (1.905 cm) for the quarter, nickel and dime size items, respectively. The die cuts items of the array from left to right, top and alternate odd rows below: large, medium, small, large, medium, small and so forth; second and alternate even rows below: the opposite of the top and odd, that is, small, medium, large and so forth; from top to bottom left and alternate odd columns to the right: large, small, large, small and so forth; second to the left and alternate even columns to the right: medium, medium, medium, medium and so forth.

Figure 3:
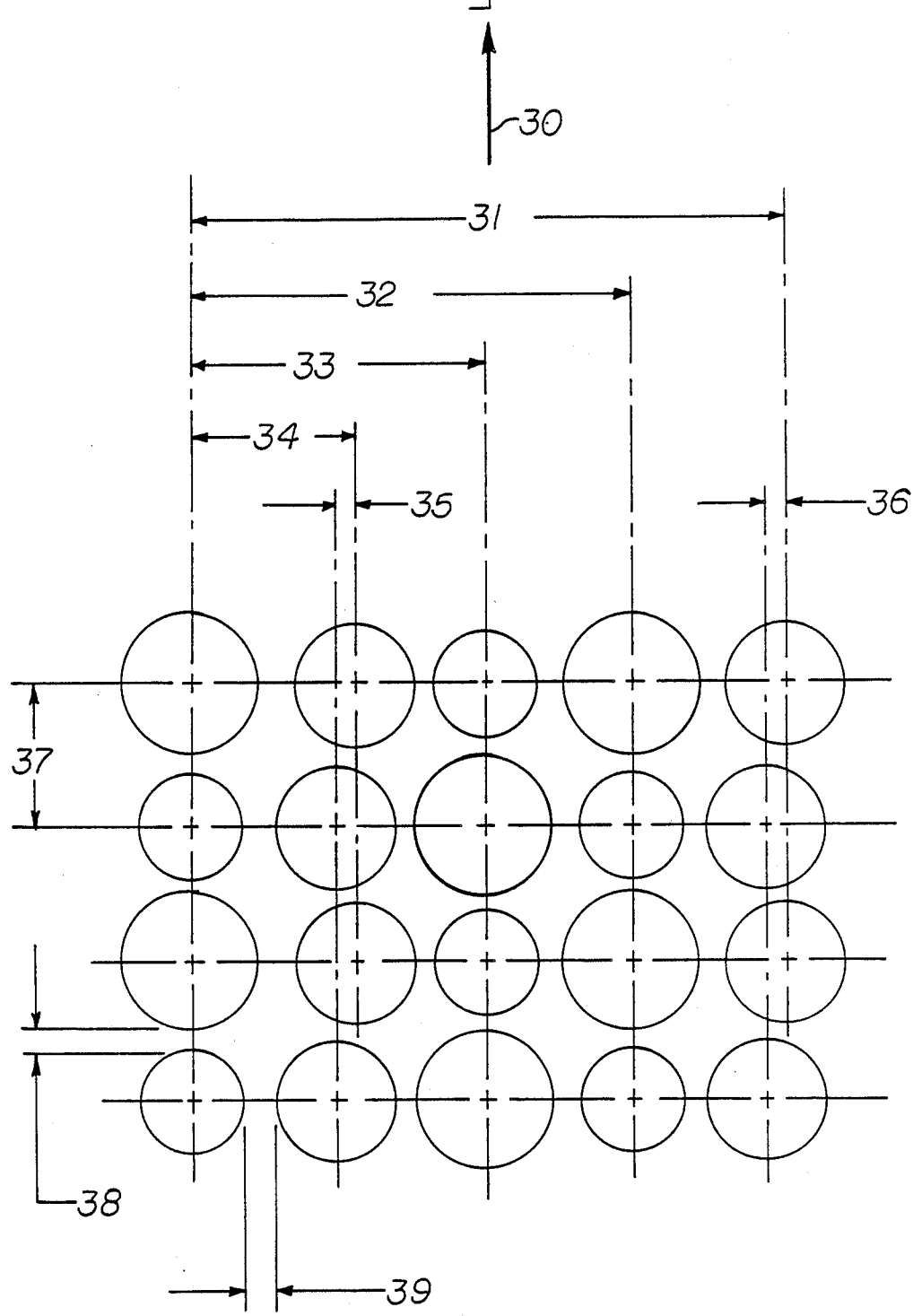
FIG. 3 (FIG. 3) is a top general plan view of assortment array (band), Pattern A.

In FIG. 3, axis of direction of flow of the band Pattern A array 30 is illustrated. The array can have dimensions of 31 about 4 7/16 inches (11.27 cm), 32 about 3 3/16 inches (8.1 cm), 33 about 2⅛ inches (5.4 cm), 34 about 1⅛ inches (2.86 cm), each of 35, 36 and 38 about ⅛ inch (0.3175 cm) with 35 and 36 to about zero inches (0 cm), 37 about 1 inch (2.54 cm) and 39 about 3/16 inch (0.476 cm). The band Pattern A array generally can result from cutting die Pattern A array. The band Pattern A array can provide the assortment which is suitable for the uniform baking.

Figure 4:
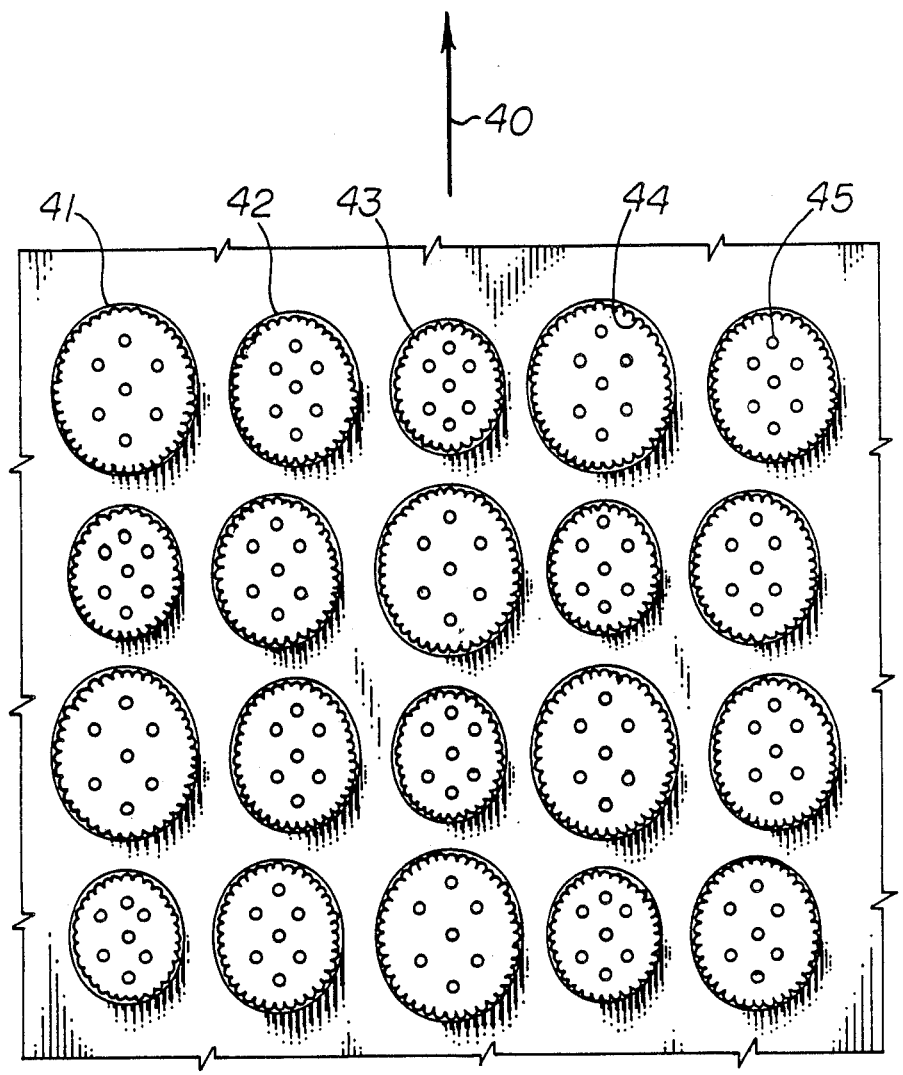
FIG. 4 (FIG. 4) is a top view of scalloped interposit cutting die, Pattern A.

In FIG. 4, anticipated axis of direction of flow of the dough sheet to be cut 40 is illustrated. Cutting die 41 is for the large size item, for example, the quarter size piece. Cutting die 42 is for the medium size item, for example, the nickel size piece. Cutting die 43 is for the small size item, for example, the dime size piece. The shade lines in connection with such cutting dies as 41, 42, 43 and so forth indicate that the dies have a depth thereto, for example, about ¼ to ⅓ inches (0.635 to 0.847 cm). Scallop 44 and docker hole 45 are also illustrated. The die array of FIG. 4, like that of FIG. 2, is generally suitable for provision of scallopped circular, laminated, buttery flavored self-rising, chemically leavened cracker dough assortment array of the general band Pattern A which is suitable for such further processing as, for example, the salting, uniform baking and spray oiling.

Figure 5:
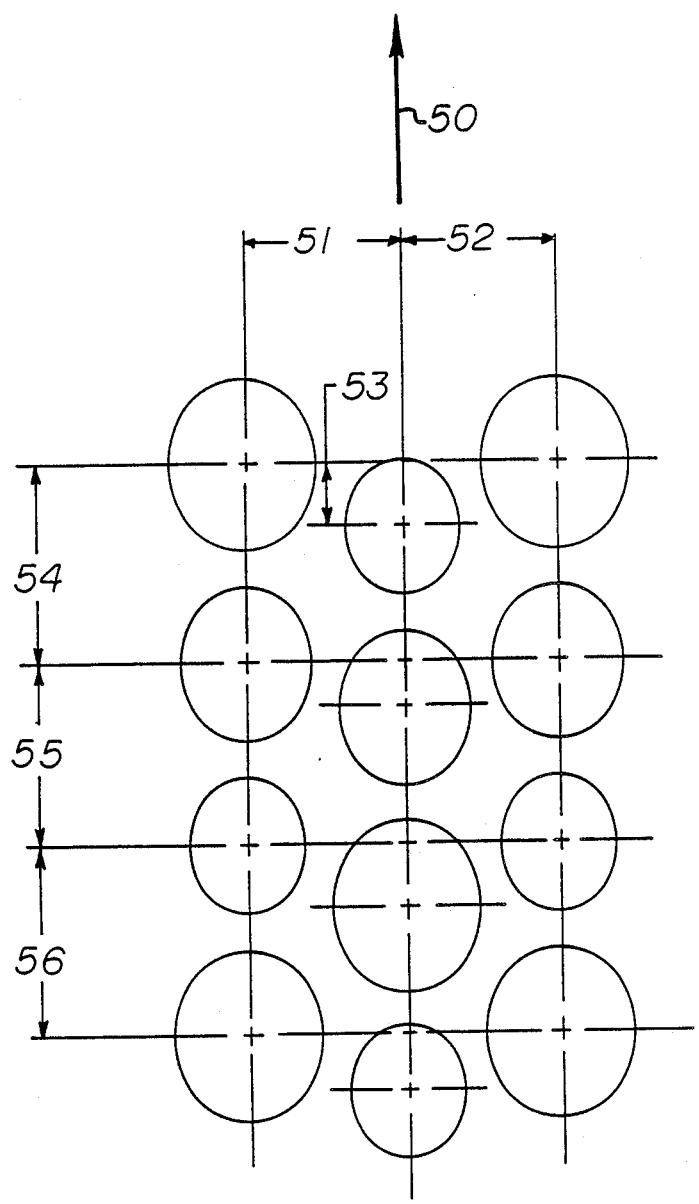
FIG. 5 (FIG. 5) is a top general plan view of interposit cutting die, Pattern B.

In FIG. 5, anticipated axis of direction of flow of the dough sheet 50 which is stretched along this axis is illustrated. The general cutting die Pattern B can have dimensions of each of 51 and 52 about 1.014 inches (2.56 cm), 53 about 4.09 inches (10.39 cm), 54 about 1.26557 inches (3.21 cm), 55 about 1.13097 inches (2.87 cm) and 56 about 1.1938 inches (3.03 cm). The cuts are each circularly oblong along the axis 50. The array is row staggerred. The die cuts items of the array from top to bottom, left hand and alternating columns to the right: large, medium, small, large, medium, small, and so forth; alternating row staggerred columns therebetween, from top to bottom; the general opposite of the left and even columns, that is, small, medium, large, and so forth. The top and third alternating rows are from left to right large, small, large, small and so forth; the second from the top and third alternating therefrom rows are medium, medium, medium, medium, medium and so forth, and the third from the top and third alternating therefrom rows are opposite the first et seq., that is, from left to right small, large, small, large and so forth.

Figure 6:
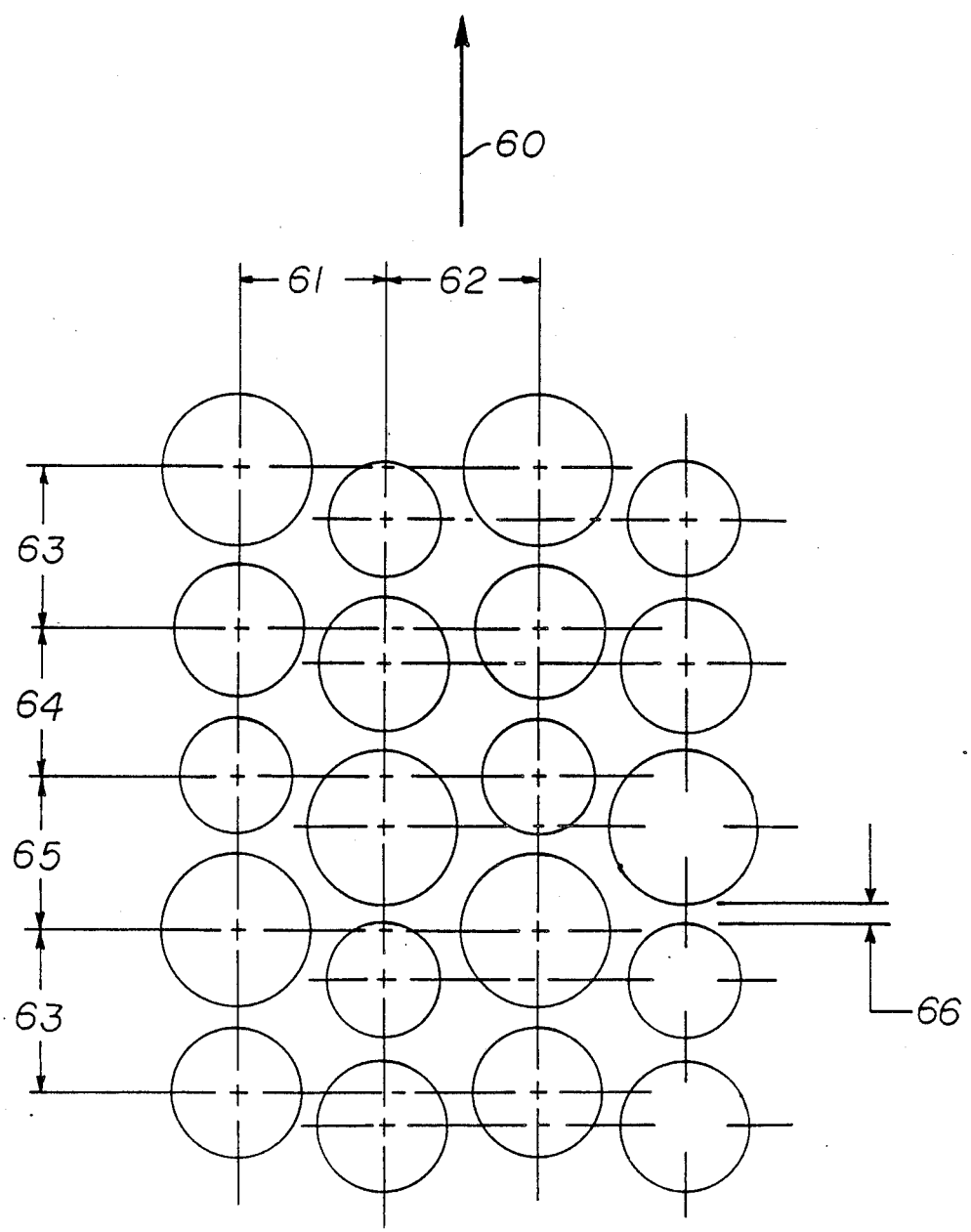
FIG. 6 (FIG. 6) is a top general plan view of assortment array (band), Pattern B.

In FIG. 6, axis of direction of flow of the band Pattern B array 60 is illustrated. The array can have dimensions of each of 61 and 62 about 1.014 inches (2.56 cm), 63 about 1 1/16 inches (2.70 cm), 64 about 15/16 inches (2.38 cm), 65 about 1 inch (2.54 cm), 66 about ⅛ inch (0.3175 cm), 67 about 1 inch (2.54 cm), 68 about ¾ inch (1.905 cm), and 69 about ⅞ inch (2.22 cm). The band Pattern B array generally can result from cutting die Pattern B array. The band Pattern B array can provide the assortment which is suitable for the uniform baking, for example, the buttery flavored, self-rising, chemically leavened cracker dough assortment array.

In FIG. 7, anticipated axis of direction of flow of the dough sheet to be cut 70 is illustrated. The cutting die pattern, which is of Pattern B, can have dimensions of 71 about 9.7498 inches (24.76 cm), 72 about 1.0140 inches (2.56 cm), each of 73 or 77 about 0.4688 inches (1.19 cm), 74 about 1.2812 inches (3.25 cm), 75 about 1.1562 inches (2.94 cm) and 76 about 1.2188 inches (3.10 cm). The pattern is in general like that of FIG. 5 and is also suitable to provide the array of FIG. 6. As a reciprocating cutting die, the total cutting die pattern (not fully illustrated) based on the partial pattern of FIG. 7 can have about 36 columns with about 9 rows and have a cutting edge, which is measured generally perpendicular to the axis 70 and to the columns, about 36.940 inches (93.873 cm), and thus, should the dimension 72 be so fully measured thirty-five spaces on general center to the left from the general center of the right hand side column, it could be fully about 35.490 inches (90.14 cm).

Figure 8:
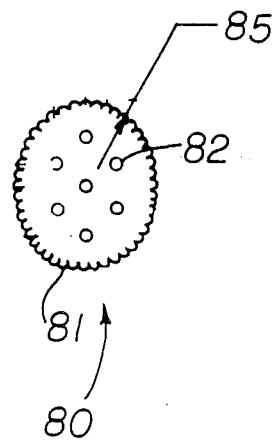
FIG. 8 (FIG. 8) is a top plan view of scalloped production interposit cutting die, quarter size.

In FIG. 8, the quarter size cutting die 80 is separately illustrated. The scallop 81 is one of fifty, and the docker hole 82 is one of seven. The die has dimensions of 83 about 1.0000 inch (2.54 cm), 84 about 1.1240 inches (2.85 cm), 85 (scallop radius) about 0.032 inches (0.08 cm), 86 about 0.1850 inches (0.47 cm), 87 about 0.1550 inches (0.39 cm) and 88 about 0.3250 inches (0.83 cm). The dimension 84 is typically taken parallel with the axis of direction of expected flow of the stretched dough sheet such as the axis 70 of FIG. 7. The die is about two inches (5.1 cm) deep.

Figure 9:
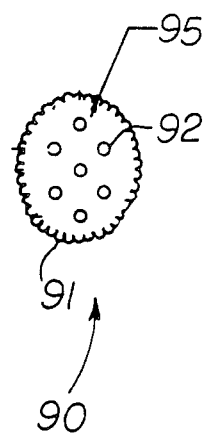
FIG. 9 (FIG. 9) is a top plan view of scalloped production interposit cutting die, nickel size.

In FIG. 9, the nickel size cutting die 90 is separately illustrated. The scallop 91 is one of forty-four, and the docker hole 92 is one of seven. The die has dimensions of 93 about 0.8670 inches (2.20 cm), 94 about 1.0000 inches (2.54 cm), 95 (scallop radius) about 0.032 inches (0.08 cm), 96 about 0.1630 inches (0.41 cm), 97 about 0.1400 inches (0.36 cm) and 98 about 0.2870 inches (0.73 cm). The dimension 94 is typically taken parallel with the axis of direction of expected flow of the stretched dough sheet such as the axis 70 of FIG. 7. The die is about two inches (5.1 cm) deep.

Figure 10:
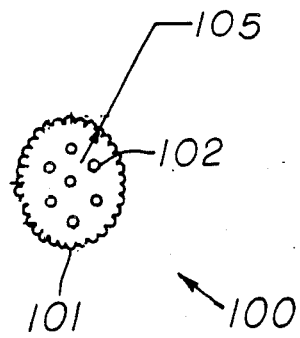
FIG. 10 (FIG. 10) is a top plan view of scalloped production interposit cutting die, dime size.

In FIG. 10, the dime size cutting die 100 is separately illustrated. The scallop 101 is one of thirty-eight, and the docker hole 102 is one of seven. The die has dimensions of 103 about 0.7520 inches (1.91 cm), 104 about 0.8760 inches (2.23 cm), 105 (scallop radius) about 0.032 inches (0.08 cm), 106 about 0.1400 inches (0.36 cm), 107 about 0.1250 inches (0.32 cm) and 108 about 0.2500 inches (0.64 cm). The dimension 104 is typically taken parallel with the axis of direction of expected flow of the stretched dough sheet such as the axis 70 of FIG. 7. The die is about two inches (5.1 cm) deep.

Figure 11:
FIG. 11 (FIG. 11) is a side plan view of a docker hole pin for the scalloped production interposit cutting dies.

In FIG. 11, docker hole pin 110 is illustrated. The pin 110 can have dimensions of diameter 111 about 0.080 inches (0.20 cm), 112 about 2.003 inches (5.09 cm), and dough docker hole punching tip 113 can have radius of about 0.040 inches (0.10 cm).

Thin uniformly bakeable edible assortments and so forth are thus provided. Sundry modifications and adaptations can be made by the artisan and by the routineer pursuant to the instant invention without departing from its true spirit and scope especially as particularly pointed out by the following distinctly claimed subject matter.

What is claimed is:

1. A method of uniformly baking an array of dough pieces of different weights comprising the steps of;
    (a) preparing an array of dough pieces wherein said array is made up of a plurality of substantially parallel spaced-apart sets whereby said array has a uniform weight distributions, each of said sets comprising first and second substantially parallel subsets of dough pieces wherein each subset is comprised of an equal number of different weight and size dough pieces, said dough pieces of each subset differing by weight from 10 to 50% by weight of a preselected intermediate dough piece of the subset; said first subset having its dough pieces arranged in a row in descending order by weight; said second subset having its dough pieces arranged in a row substantially parallel to the first subset in ascending order by weight whereby the largest dough piece of each subset is adjacent the smallest dough piece of the other subset; and
    (b) baking the array.

2. The method of claim 1 wherein the dough pieces in each subset are equally spaced apart.

3. The method of claim 2 wherein the sets of dough pieces are spaced apart a distance substantially equal to the space between the dough pieces of each subset.

4. The method of claim 1 wherein the dough pieces are substantially round or substantially oblong having a longitudinal dimension in the direction from one row to another.

5. The method of claim 1 comprising placing the array on a continuously moving baking conveyor surface.

6. The method of claim 1 wherein the array comprises essentially an equal number of each different size dough piece.

7. The method of claim 1 wherein the dough pieces of each set are spaced apart a distance of about 5% to 25% of a diameter of the preselected intermediate size dough piece.

8. The method of claim 1 wherein the subsets of dough pieces are disposed in rows transverse to the direction of movement of the pieces through a baking oven and wherein the large dough piece of the first subset and the smallest dough piece of the second subset are aligned along a longitudinal axis substantially perpendicular to the transverse row and wherein centers of said intermediate pieces of each subset are spaced differently from said longitudinal axis.

9. A method of uniformly baking an array of three different sizes of dough pieces comprising the steps of;
  (a) preparing an array of dough pieces wherein said array is made up of a plurality of uniform sets of dough pieces arranged in a plurality of substantially parallel spaced-apart rows whereby said array has a substantially uniform weight distribution, each of said sets comprising first and second substantially parallel subsets of dough pieces wherein each subset is comprised of three different weight and size dough pieces wherein the largest and smallest dough piece differ from an intermediate size piece by 10 to 50% by weight of the intermediate size dough piece; said first subset having its dough pieces arranged in a row in descending order by weight; said second subset having its dough pieces arranged in a row substantially parallel to the first subset in ascending order by weight whereby the largest dough piece of each subset is adjacent the smallest dough piece of the other subset;
  (b) baking the array.

10. The method of claim 9 wherein said dough piece is substantially round on substantially oblong having a longitudinal dimension in the direction from one row to another.

11. The method of claim 9 wherein the dough pieces in each subset are equally spaced apart.

12. The method of claim 11 wherein the sets of dough pieces are spaced apart a distance substantially equal to the space between the dough pieces of each subset.

13. The method of claim 11 wherein the dough pieces of each subset are spaced apart a distance from about 5 to 25% of the diameter of the intermediate size dough piece.

14. The method of claim 9 wherein the subsets of dough pieces are disposed in rows transverse to the direction of movement of the pieces through a baking oven and wherein the largest dough piece of the first subset and the smallest dough piece of the second subset are aligned in a longitudinal axis substantially perpendicular to said transverse row and wherein the centers of the intermediate pieces of each subset are spaced differently from said longitudinal axis.

15. The method of claim 9 comprising placing the array on a continuously moving baking conveyor surface.

16. A method of uniformly baking an array of dough pieces of different weights comprising the steps of;
  (a) preparing an array of dough pieces wherein said array is made up of a plurality of substantially uniform sets of dough pieces arranged in a plurality of parallel equally spaced-apart rows whereby said array has a uniform weight distribution throughout; each of said sets comprising first and second substantially parallel subsets of dough pieces wherein each subset is comprised of an equal number of different size dough pieces, said dough pieces of each subset differing by weight from about 10 to 50% by weight of a preselected intermediate dough piece of the subset; said first subset having its dough pieces arranged in a column substantially transverse to the rows of the array in descending order by weight; said second subset having its dough pieces arranged in a column substantially parallel to the first subset in ascending order by weight whereby the largest dough piece of each subset is adjacent the smallest dough piece of the other subset; and
  (b) baking the array.

17. The method of claim 16 wherein said dough pieces are substantially round or substantially oblong having a longitudinal axis substantially perpendicular to the axis of the transverse rows.

18. The method of claim 16 wherein the dough pieces in each subset are equally spaced apart.

19. The method of claim 18 wherein the sets of dough pieces are spaced apart a distance substantially equal to the space between the dough pieces of each subset.

20. The method of claim 16 wherein the dough pieces are spaced apart a distance from about 5 to 25% of the diameter of the intermediate size dough piece.

21. The method of claim 16 wherein the subsets of dough pieces are staggered with respect to each other.

22. The method of claim 16 wherein the array is on a continuously moving baking conveyor surface.

* * * * *